Aug. 22, 1950     W. H. WOLOWITZ     2,520,077
PRINTING IDENTIFICATION PLATE OR THE LIKE
Filed Aug. 23, 1949                      2 Sheets-Sheet 1
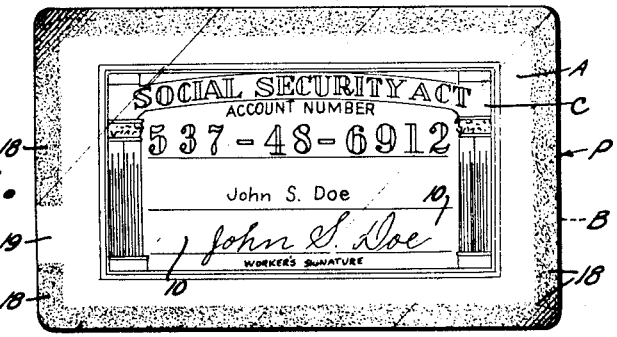
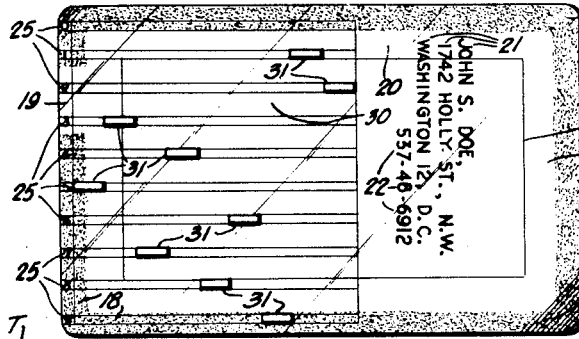
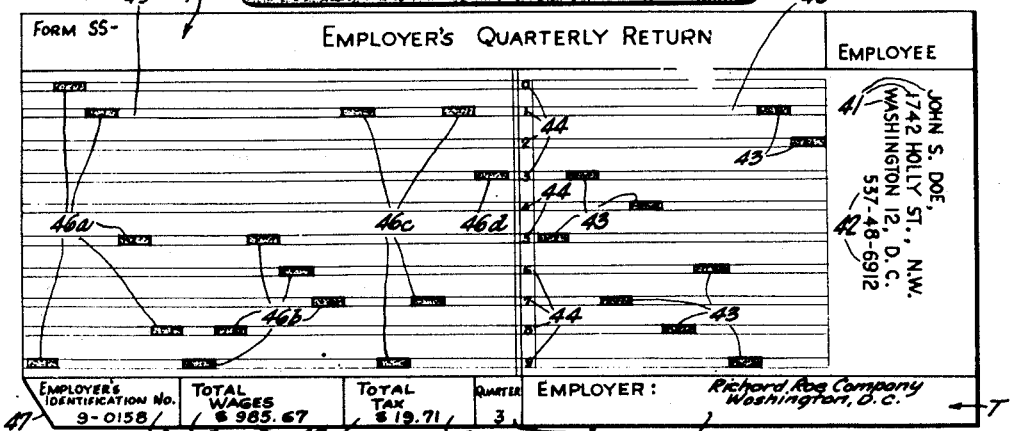
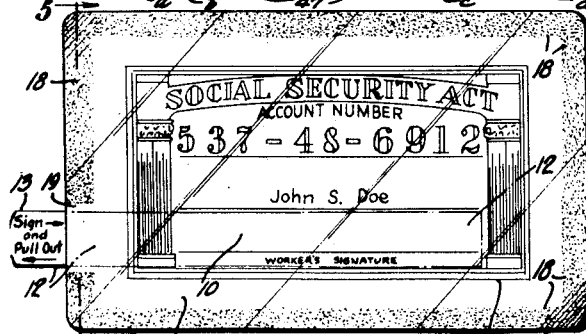
INVENTOR.
WILLIAM H. WOLOWITZ
BY
H. S. Lombard
ATTORNEY Aug. 22, 1950        W. H. WOLOWITZ        2,520,077

PRINTING IDENTIFICATION PLATE OR THE LIKE

Filed Aug. 23, 1949        2 Sheets-Sheet 2

INVENTOR.
WILLIAM H. WOLOWITZ
BY
H. S. Lombard
ATTORNEY

Patented Aug. 22, 1950

2,520,077

UNITED STATES PATENT OFFICE 2,520,077

PRINTING IDENTIFICATION PLATE
OR THE LIKE

William H. Wolowitz, Washington, D. C.

Application August 23, 1949, Serial No. 111,902

13 Claims. (Cl. 101—369)

1

This invention relates to printing devices, and the like, which are employed in an improved method or system in which the printing devices serve to record a business transaction directly onto a tabulating or statistical card for use in automatic card sorting and tabulating machines. The present application is a continuation-in-part of prior copending application Serial Number 94,120 filed May 19, 1949.

In many business establishments such as department stores, and the like, customers having charge or credit accounts are provided with identification tags in the form of plates having raised characters thereon indicating the customer's name and address, and usually the number of the customer's account. This identification tag is adapted to be employed in a press or printing machine whereby such information identifying the customer is printed or otherwise reproduced on a sales or record slip on which the clerk writes in the usual details of a transaction such as the amount, department, type of sale, date, etc. When the sales or record slip reaches the accounting department, the usual practice in large business establishments is to make an accounting record of the information on the sales or record slip by transferring the data thereon onto tabulating or statistical cards for use in automatic card sorting and tabulating machines. This procedure necessarily requires a separate operation for punching or otherwise providing sensing marks on the tabulating cards and involves the attendant possibility of error and the keeping of files of both the sales slips and the tabulating cards for future reference in the event that verification of any detail of the transaction is required. Also, it has heretofore been a difficult problem in many instances to read or locate a tabulating card prepared with perforated or other blank sensing marks inasmuch as such sensing marks usually are the only identifying means on the card.

The foregoing prior application discloses an improved method for recording all or any part of the data of a business transaction directly onto a tabulating card in a procedure which eliminates the aforesaid separate operation for punching or otherwise providing sensing marks on the tabulating card, and the attendant cost for such punching machines, or the like, and the operators thereof, and the aforementioned possibility of error involved in any such procedure requiring a separate operation for transferring data from a sales or record slip onto a tabulating card. To this end, there is employed an improved

2 printing or reproducing means comprising an identification tag or plate, or the like, having elements thereon for printing or otherwise forming sensing marks directly onto a tabulating card at the time of the transaction in any suitable way such as, for example, in the manner in which prior art types of identification plates are used to print the name, address and account number of a customer onto a record or sales slip. The identification plate otherwise comprises elements for printing or otherwise forming sensing marks onto a tabulating card with said sensing marks arranged according to a code or table based on the order and numeral values of the individual digits of the customer's account number. The improved method also discloses the provision of such coded sensing marks together with individual numerals in the same order and of the same values as the digits of the account number such that the account number may be easily and quickly visually inspected and read directly from the sensing marks on the tabulating card. In general, the arrangement is such that an identification plate or tag having such elements for printing or otherwise forming sensing marks on a tabulating card are provided with any one or more or all of the foregoing described features, and the identification plate otherwise provided with an area bearing the customer's name, address, account number and any other related constant or source data in an arrangement in which such constant or source data is adapted to be printed directly onto the tabulating card at the same time that the aforesaid coded sensing marks are printed or otherwise formed thereon.

An identification plate having the foregoing described features, either in whole or in part, is adapted to be used in the aforesaid method or system for recording a business transaction directly onto a tabulating card in a manner whereby the tabulating card is provided with customer identifying matter both in the form of readable printed characters for visual inspection purposes and also with sensing marks adapted for card sorting and tabulating machines now in use.

In conjunction with such an identification plate and the described use thereof, the improved method or system contemplates any suitable means for simultaneously printing or otherwise forming on the tabulating card additional groups of similar sensing marks representing variable or selective data such as the amount, date, origin, nature, etc., of the transaction, and still further, with such variable data also indicated by readable numerals or letters printed on the tabulating card; and thus, in accordance with said improved method or system, there may be recorded all the required or necessary details of any business transaction onto a tabulating card by means of both printed characters and sensing marks printed or otherwise formed directly on said tabulating card.

In many instances, the identification tag or plate furnished the customer or other party to a potential transaction is in the form of an identification or credit card which is signed by the party to whom it is issued and the signature thus provided used to verify the signature of said party at the time of a transaction to guard against fraudulent or unauthorized use of the identification card. Frequently the fraudulent use of a credit card, or the like, goes undetected by reason of a skillful change or alteration in the signature on the card, and, in many large scale establishments such losses involve a very sizable amount. In order to prevent change or alteration of a signature on such identification cards, the cards have been furnished in sealed cases which, of course, requires that the customer be present to sign the card before it is inserted into the case and the case sealed. This procedure is not practical in many instances, as, for example, in the case of a large concern using a system in which new credit cards are issued periodically for suitable credit control and such cards mailed to the customers.

One of the primary objects of this invention is to provide an improved construction and arrangement of a sealed case or shield for an identification card, or the like, on which a signature or other writing or marking may be inscribed after the card has been sealed within the case, and which signature is not accessible for change or alteration without mutilating or destroying the sealed card case.

A further object of the invention is to provide an improved construction and arrangement for a sealed card case of this character which comprises a removable reproducing means by which a signature may be inscribed on the card while sealed within the case, and said reproducing means thereafter removed so that the signed card is sealed within the case and protected against any change or alteration in the signature or other data thereon.

Another primary object of the invention is for the provision of an improved construction and arrangement for a sealed card case, as aforesaid, in which the card case also defines a printing plate provided with means for printing or otherwise forming printed characters on a separate record sheet or card for recording thereon the source or constant data of a transaction, such as, for example, the name, address and account number of the party identified by the card within the case.

A further object of the invention is to provide an identification plate comprising an identification card within a sealed case, as described, which is provided with elements for printing printed characters, as aforesaid, and also with elements for printing or otherwise forming corresponding sensing marks onto a tabulating card for use in automatic card sorting and tabulating machines.

A further object of the invention is to provide such an identification plate in which the elements for printing or otherwise forming sensing marks onto a tabulating card are arranged according to a code or table based on the order and numeral values of the individual digits of the customer's account number, and further, with the sensing marks provided on the tabulating card in a highly simplified arrangement that is admirably suited for card sorting and tabulating machines now in use.

Another object of the invention is to provide such an identification plate in which the elements for printing or otherwise forming sensing marks are arranged to provide such sensing marks on a tabulating card according to a simple code or table, as aforesaid, together with identifying means by which the digits of an account number may be easily and quickly determined directly from the locations of the sensing marks on the tabulating card.

A further object of the invention is to provide an identification plate which comprises a plastic plate member on which the elements for printing or otherwise forming sensing marks on a tabulating card are provided with any one or more or all of the foregoing described features, and said plastic plate member otherwise provided with integrally formed characters for printing the customer's name, address, account number and any other constant or source data in an arrangement in which such constant or source data is adapted to be printed directly onto the tabulating card at the same time that the aforesaid sensing marks are printed or otherwise formed thereon.

A further object of the invention is to provide an identification plate having the foregoing described features, either in whole or in part, and which is adapted to be used in an improved method or system for recording a business transaction directly onto a tabulating card in a manner whereby the tabulating card is provided with customer identifying matter both in the form of readable printed characters for visual inspection purposes and also with sensing marks for use in automatic card sorting and tabulating machines. In this regard, the invention contemplates, further, the provision of such an identification plate for use in conjunction with a printing machine or apparatus which is adapted simultaneously to print or otherwise form on the tabulating card additional groups of similar sensing marks representing variable or selective data such as the amount, date, origin, nature, etc., of the transaction, and still further, with such variable data also indicated by readable numerals or letters printed on the tabulating card in a manner whereby the necessary details of any business transaction may be recorded directly onto a tabulating card by means of such printed characters and sensing marks.

Further objects and advantages, and other new and useful features in the construction, arrangement and general combination of elements of the invention will be readily apparent as the following description proceeds with reference to the accompanying drawings, for purposes of illustration but not of limitation, in which like reference characters designate like parts throughout, and in which:

Fig. 1 is a plan view of the front of a completed identification plate comprising a signed identification card contained within a sealed case in accordance with the invention;

Fig. 2 is a similar plan view of the back of the identification plate shown in Fig. 1;

Fig. 3 is a plan view of a tabulating card showing, by way of example, the manner in which the details of a transaction may be recorded thereon by an improved method employing the identification plate shown in Figs. 1 and 2;

Fig. 4 is a plan view similar to Fig. 1 showing the general form in which the identification plate is prepared in blank with the unsigned identification card sealed in the case and ready to be signed;

Fig. 5 is an exploded sectional view of Fig. 4 as shown along line 5—5 looking in the direction of the arrows;

Fig. 6 is a plan view of a tabulating card showing another example in which the details of a transaction may be recorded thereon employing an identification plate of the general character shown in Figs. 1 and 2; and, Fig. 7 is a similar plan view showing a further example of the recording of the details of a transaction on a tabulating card.

Referring now, more particularly, to the drawings, Fig. 1 illustrates an example of the general arrangement and appearance of the front face of a completed identification plate P in accordance with the invention which is provided in the manner of a seal case or shield for a signature type of identification card C contained within the case. Such an identification plate P preferably is prepared in blank substantially as shown in Fig. 4 with the unsigned signature card C sealed therein and ready to be inscribed with the signature of the party to whom the identification plate is issued. When such signature has been inscribed, there is produced the complete and validated identification plate P shown in Fig. 1 with the signed identification card C sealed therein in a manner which prevents change or alteration of the signature or any other data on said card.

In a preferred construction, the identification plate P is provided by a pair of similar plate members A, B, Fig. 5, which are made of relatively thin sheets or layers of any suitable transparent plastic material such as Vinylite, or the like. The front plate member A may be provided in any desired manner of such transparent plastic sheet material while the back plate B is made of a similar plastic sheet material or of thin sheet metal or fibre composition sheet material on which there may be formed projections or raised characters on the outer face of the plate defining printing elements for purposes presently to be described.

The signature type of identification card C to be sealed between said plate members A, B, may, of course, be of any kind of such data sheet or the like, and, in the present example, the invention is shown by way of illustration only, in connection with the well known standard form of Social Security card which is now in wide and extensive use. Such a card C is typical of identification cards in general which include an account number for the party or customer to whom the card is issued and an area 10, Figs. 1 and 4, on which the signature of the party or customer is inscribed for verification purposes. In accordance with the invention, there is provided over such signature area 10, a reproducing means 12 by which a signature may be inscribed on said card C after it has been sealed within the case or shield defined by the secured plate members A, B.

The signature reproducing means 12, Fig. 4, is provided in the form of a removable strip or sheet which overlies the signature area 10 on the identification card C and includes a projecting tab portion 13 that extends outwardly beyond an edge of the complete plate P. As illustrated in the exploded view of Fig. 5, said reproducing strip or sheet 12 comprises a layer 15 having carbon material on both faces thereof, and, an overlying layer of light colored onion skin or tissue paper 16 adjacent the transparent front plate member A.

With the described parts of the identification plate in the relation shown in Figs. 4 and 5, the plate members A, B are secured together by a film of suitable adhesive or bonding cement, represented by the stippling 18, which is applied between the plate members A, B, around the periphery thereof except for a small passage 19 through which the projecting tab portion 13 of the reproducing strip 12 extends as shown in Fig. 4. The bonding of the plate members A, B, may be effected in any suitable way, as by heat, pressure or separate fastening means to provide a case or shield in which the identification card C is sealed together with the reproducing strip 12 but in a manner whereby said strip may be removed by a pull on the projecting tab portion 13.

Accordingly, the sealed completed identification plate containing the unsigned card C appears substantially as shown in Fig. 4 with said card C ready to be provided with the signature of the party to whom the identification plate is issued through the medium of the reproducing strip 12. The signature may be produced by any suitable means such as a pencil, stylus or ball point pen which is applied directly to the outer plate member A and the signature written in the usual manner over the signature area 10 on said card C. As the signature is written, an image thereof is formed on said card area 10 through the adjacent back face of the double-faced carbon strip 15, Fig. 5. At the same time, the front face of said carbon strip 15 forms on the tissue paper 16 a similar image of the signature which is visible to the writer. This permits the writer to see the formation of his signature as usually written and thus ensures an accurate reproduction of the writer's usual signature on the area 10 of the identification card C.

After the signature is thus provided on said card C, the reproducing strip 12 is readily withdrawn through the passage 19 by a suitable pull on the projecting tab portion 13 thereof. The identification plate P is then in complete and validated form, as shown in Fig. 1, with the signed identification card C sealed therein on all sides by the bonding 18 except for the small passage 19 which, of course, may also be cemented to seal the same, if desired. From the foregoing, it will be appreciated that the blank identification plates, as shown in Fig. 4, may be provided on a quantity basis and ready to be signed when issued without further handling which, of course, is highly advantageous in instances where the identification plates are mailed out to the customers of a large concern, as previously mentioned, and likewise, in various other instances where speed and facility are necessary or desirable in issuing a large number of identification plates.

It will also be appreciated that the signed identification card C is completely sealed within the case defined by the plate members A, B, such that the card is not accessible for any fraudulent change or alteration of the signature or other data thereon except by a mutilation or destruction of the plate members A, B, which obviously would indicate that the identification plate has been tampered with and should not be honored for any purpose.

While there has been described in the present example only the inscription of a signature on the card or sheet C, it is quite apparent that any other data may be inscribed in a similar manner on said card C as sealed with the case such as, for example, an account or code number, the date of signing and selected details of description of the party to whom the identification plate is issued. To this end, the reproducing strip or sheet 12 is so provided as to cover any suitable area of the card C as necessary to enter whatever data that may be required. In this regard, the front and back members A, B, of a similar sealed case may be provided in any enlarged size to accommodate any data sheet or card in the form of a certificate, license, diploma or other valuable paper on which a signature or any other matter may be written, typed or otherwise inscribed by printing means applied directly to the front plate member A to reproduce any such written or printed matter on the data sheet sealed within the case in the same general manner described for providing a signature on the card C as sealed within said identification plate P.

The back plate member B, Figs. 2 and 5, is provided on its outer face with raised surfaces or projections which define elements for printing or otherwise forming printed characters on a separate record sheet such as a tabulating card T, Fig. 3, for example. The area 20 at one end portion of said plate member B, Fig. 2, is provided with such raised surfaces or projections 21 in the form of type adapted to provide printed characters corresponding to the data on the identification card C and any other constant or source data regarding the holder of the identification plate such as the customer's name, address and the number of the customer's account indicated at 22. In a like manner, the printing elements on the plate portion 20 may be provided to identify, similarly, an individual in any related type of transaction such as, for example, an employee in a factory in the use of the identification plate for payroll and time card purposes, and further, to identify any goods, product or other item which may be designated by a number generally referred to as an account number.

A larger adjoining area 30 on said back plate member B, Fig. 2, is provided with raised printing elements 31 which are selectively provided on said area in accordance with a code or table based on the order and value of each digit or numeral in any account number 22 on the identification plate P or on the card C, Fig. 1. Preferably the printing elements 31 are provided together with suitable printed characters for identifying the values thereof. To this end, there is provided a transverse column of printing elements 25 for printing similarly spaced identifying numerals from 0 to 9, inclusive, which permit said printing elements 31 to be easily read and checked against the printed account number 22 for visual inspection purposes. Thus, if desired in certain instances, the printed numbers 22 may be omitted inasmuch as the required information of an account number may be determined directly from the printing elements 31 and identifying numerals 25.

In regard to the printing elements 31, it is to be understood that the term "printing" in any part of this disclosure is intended to refer to and cover the provision of any form of sensing mark, numeral, letter or other character formed on a tabulating card or other sheet in any manner by printing elements or equivalent scoring, cutting or punching elements or devices provided on the identification plate P.

In order to provide the printing elements 31 on the identification plate according to a code based on the order and value of each numeral or digit represented thereby, the plate area 30, Fig. 2, is so plotted as to provide for any desired number of transverse columns depending on the number of digits in the account number 22. In each of such transverse columns, any selected printing element 31 representing a number or digit from 0 to 9, inclusive, is adapted to be provided in a specific predetermined transverse location depending on the value of such numeral or digit. In the present illustration, the account number 22 is composed of nine numerals or digits and therefore, for such a system, the area 30 of the identification plate P is plotted for nine transverse columns.

In Fig. 2, it will be understood, accordingly, that in the example of an account number 22, the first digit 5 thereof has its corresponding printing element 31 formed in the first transverse column and in the predetermined transverse position for the value five as indicated by such identifying numeral 25. The second numeral or digit of the account number 22 is a 3 and the printing element 31 for this digit finds its place in the second or next adjacent transverse column in the predetermined transverse position for the value three as indicated by such identifying numeral 25. Likewise, the third numeral or digit of the account number is a 7 and the printing element for this digit finds its place in the third transverse column and in the predetermined transverse position for the value seven as indicated by such identifying numeral 25.

In a similar manner, the succeeding numerals or digits of the account number 22 find their places in the succeeding transverse columns, and in the predetermined transverse location for the particular numeral value thereof. A printing element 31 is thus provided for each numeral or digit of the account number 22 in accordance with its order in the account number and the numeral value thereof substantially as shown in Fig. 2. In the completed identification plate P, the printing elements 31 thus formed are easily read when the plate is viewed as shown in Fig. 2, and the printing elements 31 noted from left to right. It will thereupon be seen that the order and value of said printing elements 31 are identical to the order and value of the numerals or digits of the account number 22, and hence, may be easily and quickly compared with the account number 22 to insure that said printing elements 31 are correct and properly located on the completed printing plate member B.

The complete composite identification plate P thus provided is adapted to be employed in a printing machine such as disclosed in prior copending application Serial Number 108,700, filed August 5, 1949, in a manner whereby the printing elements 21, 22, 25 and 31 reproduce similar printed characters onto a tabulating card T, Fig. 3, or any similar record sheet, or the like. Thus, in the example of a tabulating card T shown in Fig. 3, in the area 40, the printing elements 21 on the plate member B reproduce similar printed characters 41 including the account number 42 printed by the account number printing elements 22. Simultaneously, the printing elements 31 reproduce the printed sensing marks 43 together with a column of identifying numerals 44 printed by the printing elements 25 on said plate member B.

It will be appreciated that the integrally formed printing elements 31 may be provided in an equivalent relationship on the front plate member A in certain instances and also, in other shapes or designs to form suitable sensing marks on any type of tabulating card for use in any particular sorting or tabulating machine. In the present example, the printing elements are shown provided in a preferred strip form by which said printing elements 31 actually print strip-like sensing marks which are precise and even in outline and of uniform consistency throughout so that a satisfactory sensing operation is insured for each of such printed sensing marks. The provision of the printing elements 31 together with the identifying numerals 25, as described, is preferable and highly advantageous in that the printing elements 31 may be easily read for visually checking same against the account number 22 on the identification plate, or on the identification card C, as aforesaid. Likewise, the sensing marks 43 and any other similar sensing marks printed on the tabulating card, Fig. 3, together with the identifying numerals 44, are also easily read in a similar manner for a quick and expeditious determination of the account number or any other number represented thereby. This is important in any system in which only blank sensing marks are printed on the tabulating cards, whereupon such identifying numerals 44 provide a most advantageous means for determining an account number on a tabulating card in much less time than would otherwise be required.

As shown in Fig. 3, the tabulating card T includes a portion 45 on which similar sensing marks 46a to 46d, inclusive, are adapted to be printed in conjunction with the printed characters 41, 42 and 44 and the sensing marks 43. These sensing marks 46a to 46d, inclusive, are of the same character as the sensing marks 43 and are provided in the same manner and relation on the card area 45 according to the same general code or table based on the order and value of the digits in the numbers represented thereby. Accordingly, said sensing marks 46a to 46d inclusive, are selectively arranged in accordance with the variable numeral values indicating the details of a transaction in any business or system requiring the keeping of records. Also provided with such selectively arranged sensing marks 46a to 46d inclusive, are conventional numerals printed on the tabulating card T on the side portion 47, for example, which indicate exactly the values of the numbers represented by said sensing marks 46a to 46d inclusive.

In the example shown in Fig. 3, the invention is disclosed by way of illustration as employed in providing the required data on a suitable Social Security quarterly return or report in the form of a tabulating card T. Thus, in the area 40 of the tabulating card, it will be understood that the constant or source data regarding the person reported on is reproduced from the identification plate P, as aforesaid. In the remaining portion 45 of said tabulating card, the example of an employer's identification number 9—0158 in the area a of the side portion 47, is represented and indicated by the group of sensing marks 46a in the same order and of the same values as the respective digits in said employer's identification number. Likewise, in the area b, the total wages $985.67 is represented and indicated by the group of sensing marks 46b; in the area c the total tax $19.71 is represented by the sensing marks 46c; and, in the area d, the quarter year period reported on is represented and indicated by the sensing mark 46d.

Such selectively arranged groups of sensing marks 46a to 46d, inclusive, are formed by selectively provided printing elements which are similar to the printing elements 31 and which are arranged in the printing machine or apparatus in a manner whereby said printing elements are set up for a printing operation in accordance with the order and value of each digit in the numbers represented and indicated thereby. The arrangement of such selectively provided sensing marks 46a to 46d, inclusive, is similar to the general procedure described for providing the printing elements 31 in coded relation on the identification plate member B and, in this regard, the printed column of identifying numerals 44 serves also for identifying such similar sensing marks 46a to 46d, inclusive. The groups of selectively arranged sensing marks 46a to 46d, inclusive, accordingly, are printed on the tabulating card T together with the sensing marks 43 and the printed characters 41, 42 and 44, aforesaid, and also if desired, with conventional numerals on the side area 47 of the tabulating card indicating exactly the numbers represented by said groups of sensing marks 46a to 46d, inclusive.

In the aforesaid prior copending application Serial Number 94,120 filed May 19, 1949, there is disclosed another example in which such a tabulating card is prepared with sensing marks in a similar manner for use in any business or department store to record the details of a sale or other transaction. A customer identification plate having printing elements provided thereon similarly to Fig. 2 is employed and likewise, the identification plate P of the present invention may be employed in a wide range and variety of applications as a customer identification plate either with or without the separate signature card C, Fig. 1. In many credit systems, a signature card is not used and accordingly, a complete customer identification plate comprising only the plate B, Fig. 2, is provided at relatively low cost as a simple one-piece device requiring only a single thickness of plastic or metal sheet material on which there may be integrally formed the printing characters 21, 22 and the elements 31 for forming sensing marks, as aforesaid.

Fig. 6 illustrates such a further application of the invention along the same general lines described with reference to Fig. 3, as employed in a sale taking place in a gasoline station, for recording the details of the transaction onto a tabulating card T' in a manner whereby said tabulating card is complete and ready to be forwarded to the accounting office of the gasoline company where it may be put to use, without further handling or preparation, in automatic card sorting tabulating machines in accordance with usual methods.

The tabulating card in any form may, of course, be provided in any selected or convenient design by which the clerk or salesman may list any particular item or other data on one side of the tabulating card with the opposite side of said card used for printing or otherwise forming thereon the printed characters and sensing marks substantially as described with reference to Figs. 1–3 inclusive. In any alternate relation, any desired additional data may be provided by writing on the same side of the tabulating card on which the sensing marks are provided so long as such writing does not affect the accuracy and effectiveness of the sensing marks on the tabulating card when put to use in card sorting and tabulating machines.

In the example of Fig. 6, it will be understood that the various items may be written in by the station attendant in any suitable form and identified by item numbers listed on the side of the card opposite to that shown as, for example, indicated by the instructions along the lower right hand side of the card. In the portion 50 of the card, the constant or source data identifying the customer is reproduced, as aforesaid, from the identification plate P carried by the customer while in the card portion 55, the groups of sensing marks 56f to 56i, inclusive, are provided in accordance with the variable details of the transaction such as shown in the side area 57. Thus, in said portion 55 of the tabulating card T', the station number 2—853 in the area f is represented and indicated by the group of sensing marks 56f in the same order and of the same values as the respective digits in said station number. Likewise, in the area g the date of the transaction such as 10—28, is represented and indicated by the group of sensing marks 56g; similarly, the items sold, as identified by any selected item numbers in the area h, such as one, three and four, as shown, are represented and indicated by the group of sensing marks 56h; and, in the area i, the amount of the sale $15.83, for example, is represented and indicated by the group of sensing marks 56i.

Fig. 7 illustrates a further application of the invention wherein a bank check in the form of a tabulating card T'' is provided with sensing marks in the same general manner as the previously described forms of the invention. In this relation, the printed sensing marks serve, in addition, as a highly practical safeguard against any fraudulent attempt to change or alter the amount of the check or any other data thereon which is represented and indicated by the sensing marks in their specific predetermined locations according to the order and value of each digit in the numbers represented thereby, as aforesaid.

In the illustration of Fig. 7, it will be understood that such a bank check in the form of a tabulating card T'' comprises a portion 50 on which the constant or source data and corresponding sensing marks identifying the payee are reproduced together with the column of identifying numerals 44 by means of an identification plate P, Fig. 2, assigned to or carried by the payee, such as an employee of a company, for example. Likewise, the identification plate P, Fig. 2, may be used in a similar manner for identifying any other payee such as a creditor to whom checks are frequently forwarded in payment of periodic bills for goods or services rendered.

In the area 65 of the tabulating card there are provided the groups of sensing marks 66p to 66s, inclusive, representing and indicating the variable data of the check such as shown along the side portion 67 by way of illustration. In the present example, the amount of the check in the area p is represented and indicated by the group of sensing marks 66p; likewise, the bank number in the area q is represented and indicated by the group of sensing marks 66q; similarly, the drawer's bank account number in the area r is represented and indicated by the group of sensing marks 66r; and, the date of the check in area s is represented and indicated by the group of sensing marks 66s. It will be appreciated that the provision of the sensing marks representing the bank number adapt the typical tabulating card type of check shown for use in card sorting and tabulating machines in a bank clearing house and in the bank on which the check is drawn as well as in the accounting office of the company drawing the check. For further bank accounting purposes, such a tabulating card is readily prepared in the form of a deposit slip in which the constant or source data regarding the depositor is provided in the area 50 by the identification plate P, and the area 65 provided with similar sensing marks such as 66p representing the amount of the deposit, and sensing marks 66s indicating the date of the deposit, together with a group of similar sensing marks for the depositor's bank account number and likewise, for any other necessary or desirable detail regarding the deposit.

As a safeguard against fraud, many checks are now made on a special paper such as the well known Protod paper which, by its composition, shows out pointedly any erasure on the paper or the use of ink eradicating fluid pursuant to an attempt to alter the check. However, such safety paper will not indicate a fraudulent change on the check of one numeral to another as, for example, the change of a three to an eight. In the use of the present invention, an important safeguard in this respect for checks and other valuable papers is obtained by the provision of the sensing marks in specific locations according to the order and value of each digit in the numbers they represent, as aforesaid, particularly the sensing marks 66p representing and indicating the amount on the check. In any fraudulent change of a digit or numeral in the amount of the check, as in the example mentioned, removal of the sensing mark representing the original digit or numeral would necessarily be required also. Any removal of a sensing mark would not be practical inasmuch as the sensing marks as printed on safety paper such as the aforesaid Protod paper, cannot be erased or deleted without leaving an easily detected blemish or imperfection which would clearly indicate the fraudulent change or alteration of the check.

While the invention has been described in detail with specific examples, such examples are intended as illustrations only inasmuch as it will be apparent that there may be provided various modifications in the construction, arrangement and general combination of elements and details disclosed without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A sealed protective case comprising a pair of case members made of sheet material, a data surface between said case members, reproducing means associated with said data surface adapted to reproduce on said data surface an image of an inscription made on a case member and transmitted to said reproducing means, said case members being secured together to seal said data surface in the case and said case having a passage providing for removal of said reproducing means.

2. A sealed protective case comprising a pair of case members made of sheet material, a data sheet between said case members, a reproducing sheet over said data sheet adapted to reproduce on said data sheet an image of an inscription made on a case member and transmitted to said reproducing sheet, said case members being secured together to seal said data sheet against removal from the case and said case having a passage providing for removal of said reproducing sheet.

3. A sealed protective case comprising a pair of case members made of sheet material, a data sheet between said case members, a reproducing sheet over said data sheet adapted to reproduce on said data sheet an image of an inscription made on a case member and transmitted to said reproducing sheet, said reproducing sheet comprising a layer having a carbon coating on both faces and a paper layer on which there is also adapted to be reproduced a visible image of the inscription, said case members being secured together to seal said data sheet against removal from the case and said case having a passage providing for removal of said reproducing sheet.

4. A protective case comprising a back case member and a front case member made of transparent sheet material, a data sheet between said case members, a reproducing sheet over said data sheet adapted to reproduce on said data sheet an image of an inscription made on the front case member and transmitted to said reproducing sheet, said reproducing sheet comprising a tab portion and a layer having a carbon coating on both faces and a paper layer on which there is also adapted to be reproduced a visible image of the inscription, said case members being secured together to seal said data sheet against removal from the case, said case having a passage for removal of said reproducing sheet, and said tab portion on the reproducing sheet projecting through said passage in position to facilitate removal of said reproducing sheet from the case.

5. A sealed protective card case comprising a back plate member and a front plate member made of transparent sheet material, a card in said case, reproducing means associated with said card adapted to reproduce on said card an image of an inscription made on said front plate member and transmitted to said reproducing means, said case members being secured together to seal said card in the case and said case having a passage providing for removal of said reproducing means.

6. A sealed protective card case comprising a back plate member and a front plate member made of transparent sheet material, a card in said case, a reproducing sheet over said card adapted to reproduce on said card an image of an inscription made on the front plate member and transmitted to said reproducing sheet, said case members being secured together to seal said card in the case and said case having a passage providing for removal of said reproducing sheet.

7. A sealed protective card case comprising a back plate member and a front plate member made of transparent sheet material, a card in said case, a reproducing sheet over said card adapted to reproduce on said card an image of an inscription made on the front plate member and transmitted to said reproducing sheet, said reproducing sheet comprising a layer having a carbon coating on both faces and a paper layer on which there is also adapted to be reproduced a visible image of the inscription, said case members being secured together to seal said card against removal from the case and said case having a passage providing for removal of said reproducing sheet.

8. A sealed protective card case comprising a back plate member and a front plate member made of transparent sheet material, a card in said case, a reproducing sheet over said card adapted to reproduce on said card an image of an inscription made on the front plate member and transmitted to said reproducing sheet, said reproducing sheet comprising a tab portion and a layer having a carbon coating on both faces and a paper layer on which there is also adapted to be reproduced a visible image of the inscription, said case members being secured together to seal said card against removal from the case, said case having a passage providing for removal of said reproducing sheet and said tab portion on the reproducing sheet projecting through said passage in position to facilitate such removal of said reproducing sheet from the sealed case.

9. An identification plate provided with an account number, said identification plate being in the form of a protective card case comprising a back plate member and a front plate member made of transparent sheet material, a card in said case, reproducing means associated with said card adapted to reproduce on said card an image of an inscription made on the front plate member and transmitted to said reproducing means, said plate members being secured together to seal said card in the case and said case having a passage providing for removal of said reproducing means, and one of said plate members being provided with elements for forming sensing marks on a record sheet representing said account number of the identification plate.

10. An identification plate provided with an account number, said identification plate being in the form of a protective card case comprising a back plate member and a front plate member made of transparent sheet material, a card in said case having a signature area, a reproducing sheet over said signature area adapted to reproduce thereon an image of a signature inscribed on the front plate member and transmitted to said reproducing sheet, said plate members being secured together to seal said card against removal from the case and said case having a passage providing for removal of said reproducing sheet, and one of said plate members being provided with elements for forming sensing marks on a record sheet representing said account number of the identification plate.

11. An identification plate provided with an account number, said identification plate being in the form of a protective card case comprising a back plate member and a front plate member made of transparent sheet material, a card in said case having a signature area, a reproducing sheet over said signature area adapted to reproduce thereon an image of a signature inscribed on the front plate member and transmitted to said reproducing sheet, said reproducing sheet comprising a tab portion and a layer having a carbon coating on both faces and a paper layer on which there is also adapted to be reproduced a visible image of the signature, said plate members being secured together to seal said card against removal from the case, said case having a passage for removal of said reproducing sheet and said tab portion on the reproducing sheet projecting through said passage in position to facilitate such removal of said reproducing sheet from the case, and said back plate member being provided with elements for forming sensing marks on a record sheet representing said account number of the identification plate.

12. An identification plate in the form of a protective card case comprising a back plate member and a front plate member made of transparent sheet material, a card in said case having an account number and a signature area, reproducing means associated with said signature area adapted to reproduce thereon an image of a signature inscribed on the front plate member and transmitted to said reproducing means, said plate members being secured together to seal said card in the case and said case having a passage providing for removal of said reproducing means, and one of said plate members being provided with elements for forming sensing marks on a record sheet representing the account number on said card within said case, said elements for forming sensing marks being arranged in specific locations according to the order and value of each digit in the account number represented thereby.

13. An identification plate in the form of a protective card case comprising a back plate member and a front plate member made of transparent sheet material, a card in said case having an account number and a signature area, a reproducing sheet over said signature area adapted to reproduce thereon an image of a signature inscribed on the front plate member and transmitted to said reproducing sheet, said plate members being secured together to seal said card against removal from the case and said case having a passage providing for removal of said reproducing sheet, and one of said plate members being provided with elements for forming sensing marks on a record sheet representing the account number on said card within the card case, said elements for forming sensing marks being arranged in specific locations according to the order and value of each digit in the account number represented thereby.

WILLIAM H. WOLOWITZ.

REFERENCES CITED

The following references are of record in the file of this patent:

UNITED STATES PATENTS

| Number | Name | Date |
| --- | --- | --- |
| 912,093 | Droitcour | Feb. 9, 1909 |
| 2,091,976 | Gollwitzer | Sept. 7, 1937 |
| 2,195,844 | Von Pein | Apr. 2, 1940 |
| 2,265,222 | Benes | Dec. 9, 1941 |
| 2,305,127 | Albers | Dec. 15, 1942 |
| 2,305,195 | Richter | Dec. 15, 1942 |
| 2,361,670 | Whitehead | Oct. 31, 1944 |
| 2,425,305 | Comegys | Aug. 12, 1947 |

FOREIGN PATENTS

| Number | Country | Date |
| --- | --- | --- |
| 706,228 | Germany | May 21, 1941 |